(12) United States Patent
Ross et al.

(10) Patent No.: US 9,887,653 B2
(45) Date of Patent: Feb. 6, 2018

(54) SENSORLESS BRUSHLESS DIRECT CURRENT (BLDC) MOTOR POSITION CONTROL

(71) Applicant: Allegro MicroSystems, LLC, Worcester, MA (US)

(72) Inventors: Thomas Ross, Howden (GB); Gianluca Allegrini, Musselburgh (GB); Yi Li, Edinburgh (GB)

(73) Assignee: Allegro MicroSystems, LLC, Worcester, MA (US)

( * ) Notice: Subject to any disclaimer, the term of this patent is extended or adjusted under 35 U.S.C. 154(b) by 73 days.

(21) Appl. No.: 15/163,943

(22) Filed: May 25, 2016

(65) Prior Publication Data

US 2017/0346420 A1    Nov. 30, 2017

(51) Int. Cl.
*H02P 6/00* (2016.01)
*H02P 6/16* (2016.01)
*H02P 6/182* (2016.01)
*H02P 6/08* (2016.01)
*H02P 6/12* (2006.01)

(52) U.S. Cl.
CPC .............. *H02P 6/182* (2013.01); *H02P 6/085* (2013.01); *H02P 6/12* (2013.01)

(58) Field of Classification Search
CPC .. H02P 6/182; H02P 6/085; H02P 6/12; H02P 6/142; H02P 6/08
USPC .................................................. 318/400.35
See application file for complete search history.

(56) References Cited

U.S. PATENT DOCUMENTS 5,616,996 A    4/1997  Tang et al.
5,627,447 A    5/1997  Unsworth et al.
(Continued)

FOREIGN PATENT DOCUMENTS

CN    1190282      8/1998
DE    19546145     6/1996
(Continued)

OTHER PUBLICATIONS

U.S. Appl. No. 13/599,234.
(Continued)

*Primary Examiner* — Kawing Chan
*Assistant Examiner* — Bradley Brown
(74) *Attorney, Agent, or Firm* — Daly, Crowley, Mofford & Durkee, LLP

(57) ABSTRACT

Described embodiments provide circuits, systems and methods for controlling operation of brushless direct current motors that include a plurality of windings. A gate driver provides control signals to switching elements that control a voltage applied to each of the windings of the motor. A zero crossing detector detects zero crossings of a voltage applied to the windings and transitions a zero crossing signal between a first logic level and a second logic level based on the detected zero crossings. A position estimator estimates an angular position of the motor, and counts in a first direction based on the first logic level of the zero crossing signal, and in a second direction based on the second logic level of the zero crossing signal. An observer determines a value of the counter after an elapsed time, and generates an angular position signal based upon the value of the counter.

42 Claims, 8 Drawing Sheets

(56) References Cited

U.S. PATENT DOCUMENTS

| | | | | |
|---|---|---|---|---|
| 5,672,948 | A | * | 9/1997 | Cohen .................. H02P 6/182 318/400.17 |
| 5,811,949 | A | | 9/1998 | Garces |
| 6,163,120 | A | * | 12/2000 | Menegoli ............... H02P 6/182 318/400.35 |
| 6,198,256 | B1 | | 3/2001 | Miyazaki et al. |
| 7,590,334 | B2 | | 9/2009 | Yabusaki et al. |
| 7,747,146 | B2 | | 6/2010 | Milano et al. |
| 8,729,841 | B2 | | 5/2014 | Reynolds et al. |
| 8,917,044 | B2 | | 12/2014 | Reynolds et al. |
| 9,088,233 | B2 | | 7/2015 | Alcorn et al. |
| 2006/0055352 | A1 | | 3/2006 | Mori et al. |
| 2007/0018599 | A1 | | 1/2007 | Yamamoto et al. |
| 2010/0027705 | A1 | | 2/2010 | Neubauer et al. |
| 2010/0295490 | A1 | | 11/2010 | Kuroshima et al. |
| 2012/0293098 | A1 | | 11/2012 | Rote et al. |
| 2013/0009578 | A1 | | 1/2013 | Reynolds et al. |
| 2014/0062365 | A1 | * | 3/2014 | Reynolds ............... H02P 6/085 318/400.35 |

FOREIGN PATENT DOCUMENTS

| | | |
|---|---|---|
| EP | 1965490 | 9/2008 |
| EP | 2280476 | 2/2011 |
| JP | H04193084 | 7/1992 |

OTHER PUBLICATIONS

U.S. Appl. No. 15/016,351, filed Feb. 5, 2016, Allegrini, et al.
U.S. Appl. No. 15/056,287, filed Feb. 29, 2016, Ambruson, et al.
U.S. Appl. No. 13/599,225, filed Aug. 30, 2012, Reynolds, et al.
Toshiba CMOS Digital Integrated Circuit, Silicon Monolithic, TB9060FN: "3-Phase Full-Wave Sensorless Controller for Brushless DC Motors"; dated Sep. 11, 2002, downloaded from www.datasheetcatalog.com; 21 pages.
Notice of Allowance dated Aug. 26, 2014; for U.S. Appl. No. 13/599,234; 16 pages.
Notice of Allowance dated Aug. 15, 2017 for U.S. Appl. No. 15/016,351; 10 pages.
Search Report and Written Opinion dated Feb. 11, 2015 for PCT Application No. PCT/US2013/054639; 10 pages.
International Preliminary Report on patentability dated Mar. 12, 2015 for PCT Application No. PCT/US2013/054639; 7 pages.
Chinese Office Action with English translation dated Nov. 2, 2016 for Chinese Application No. 201380056237.5; 22 pages.
Response to Chinese Office Action with English claims dated Mar. 14, 2017 for Chinese Application No. 201380056237.5; 106 pages.
Notice of Allowance dated Jun. 28, 2017 for U.S. Appl. No. 15/016,351; 11 pages.
Search Report and Written Opinion dated May 16, 2017 for PCT Application No. PCT/US2017/013741; 11 pages.

* cited by examiner

100

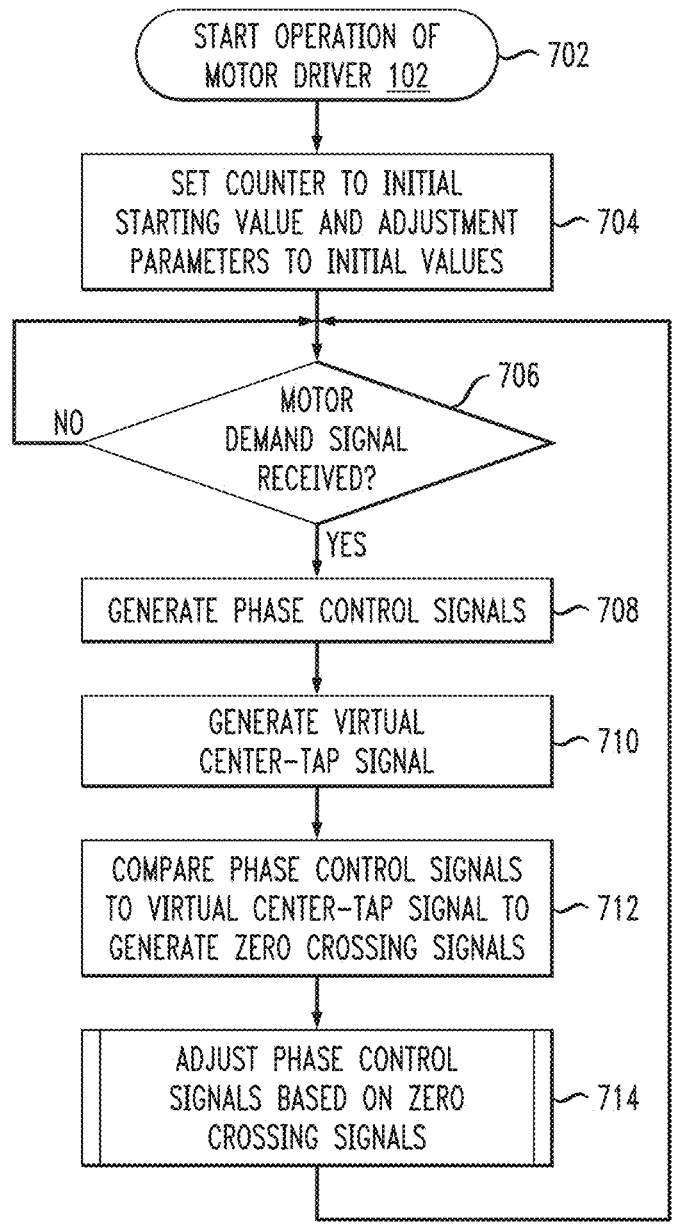

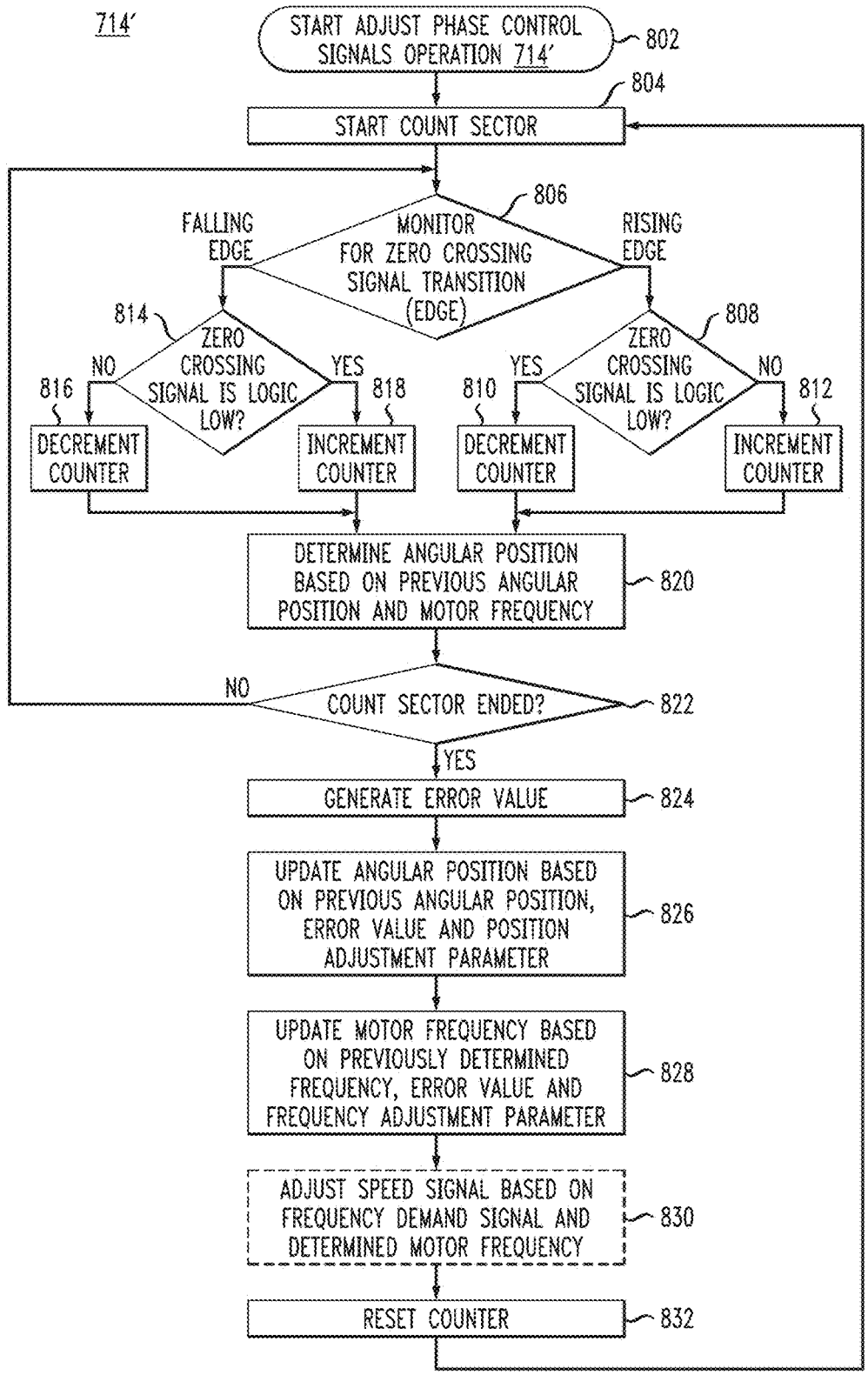

SENSORLESS BRUSHLESS DIRECT CURRENT (BLDC) MOTOR POSITION CONTROL

CROSS-REFERENCE TO RELATED APPLICATIONS

None.

STATEMENT REGARDING FEDERALLY SPONSORED RESEARCH OR DEVELOPMENT

None.

BACKGROUND

Detecting when alternating current (AC) voltage and/or current waveforms cross through a zero current (or voltage) axis (e.g., "zero crossing") is frequently performed, for example in electric motor control, lamp dimming, powerline communication and other applications. In motor control systems, a half-bridge circuit is frequently used to drive a switching node coupled to a load (e.g., the motor). There is difficulty in robustly detecting the zero-crossing when the switching node is noisy.

Switching node noise is a particular issue when MOSFETs are employed as power switches (e.g., in the half-bridge circuit) for a motor control. Motors tend to present an inductive load to the half-bridge circuit, and the combination of the inductive load with the capacitance of the MOSFETs can cause ringing on the switching node, making accurate detection of the zero crossing difficult.

Therefore, an improved zero crossing detector is envisioned to more reliably and accurately detect zero crossings of a current (or voltage) waveform of interest.

SUMMARY

This Summary is provided to introduce a selection of concepts in a simplified form that are further described in the Detailed Description. This Summary is not intended to identify key features or essential features of the claimed subject matter, nor is it intended to be used to limit the scope of the claimed subject matter.

One aspect provides an electronic circuit for controlling operation of a brushless direct current (DC) motor having a plurality of windings. The electronic circuit includes a gate driver for providing an associated control signal to each of one or more switching elements coupled to the electronic circuit. The one or more switching elements control a voltage applied to each of the plurality of windings of the motor. A controller generates a speed signal based upon a received frequency demand signal and provides the speed signal to the gate driver. A zero crossing detector detects a zero crossing of a voltage applied to at least one of the windings, and transitions a zero crossing signal between a first logic level and a second logic level based on the detected zero crossing. A position estimator estimates an angular position of the motor. The position estimator includes a counter configured to count in a first predetermined direction based on the first logic level of the zero crossing signal, and configured to count in a second predetermined direction based on the second logic level of the zero crossing signal. An observer determines a value of the counter after a predetermined elapsed time, and generates an angular position signal based, at least in part, upon the determined value of the counter.

In an embodiment, the one or more switching elements are coupled in a half-bridge circuit including at least one branch. Each branch is associated with a given one of the plurality of windings, and includes a first switching element coupled between a high supply voltage and a switching node of the given winding, and a second switching element coupled between the switching node and a low supply voltage.

In an embodiment, the gate driver receives the angular position signal from the observer, generates the control signal for each switching element based, at least in part, upon the angular position signal and the speed signal.

In an embodiment, the observer generates a frequency signal based, at least in part, upon the determined value of the counter and provide the frequency signal to the controller.

In an embodiment, the controller generates the speed signal based upon the received frequency demand signal and the frequency signal.

In an embodiment, the observer receives at least one adjustment parameter, and generates at least one of the angular position signal and the frequency signal based upon the determined value of the counter and the at least one adjustment parameter.

In an embodiment, the at least one adjustment parameter includes a frequency adjustment parameter, $K_I$. The observer generates the frequency signal by multiplying the determined value of the counter by the frequency adjustment parameter, added to a previous value of the frequency signal. In an embodiment, the at least one adjustment parameter includes a position adjustment parameter, $K_P$. The observer generates the angular position signal by multiplying the determined value of the counter by the position adjustment parameter, added to a previous value of the angular position signal and added to the frequency signal.

In an embodiment, the angular position signal is determined by: $\theta(n)=\theta(n-1)+(K_P \cdot ERROR)+FREQ(n)$, and the frequency signal is determined by: $FREQ(n)=FREQ(n-1)+(K_I \cdot ERROR)$, where $\theta(n)$ is a current value of the angular position signal, $\theta(n-1)$ is the previous value of the angular position signal, $K_P$ is the position adjustment parameter, ERROR is the determined value of the counter, $FREQ(n)$ is a current value of the frequency signal, $FREQ(n-1)$ is the previous value of the frequency signal, and $K_I$ is the frequency adjustment parameter.

In an embodiment, the frequency adjustment parameter adjusts a slope of the frequency signal, and the position adjustment parameter adjusts a slope of the angular position signal.

In an embodiment, the at least one adjustment parameter is determined based on one or more characteristics of the motor. In an embodiment, the one or more characteristics include a response time of the motor.

In an embodiment, the counter is an up/down counter to increment the value of the counter based on the first logic level of the zero crossing signal, and decrement the value of the counter based on the second logic level of the zero crossing signal. The first logic level is a logic high level, and the second logic level is a logic low level.

In an embodiment, if the determined value of the counter is non-zero, the observer adjusts the frequency signal. In an embodiment, if the determined value of the counter is a positive value, the frequency signal is increased, and if the determined value of the counter is a negative value, the frequency signal is decreased.

In an embodiment, the controller employs the frequency signal as a reference signal to compare to the received frequency demand signal to run the motor at a substantially constant frequency.

In an embodiment, the electronic circuit does not employ blanking time to determine the angular position of the motor. In an embodiment, the electronic circuit does not receive signals from one or more position sensors of the motor.

In an embodiment, the zero crossing detector detects a zero crossing of a voltage applied to all of the windings.

In an embodiment, the one or more switching elements each comprise a field effect transistor. In an embodiment, the electronic circuit is implemented in an integrated circuit. In an embodiment, the one or more switching elements are internal to the integrated circuit. In an embodiment, the one or more switching elements are external to the integrated circuit.

In an embodiment, the electronic circuit includes a center tap averaging block coupled to the zero crossing detector and a voltage applied to at least one of the windings. The center tap averaging block generates an approximate center tap voltage of the windings, and wherein the zero crossing detector detects a zero crossing based upon the approximate center tap voltage.

Another aspect provides an electronic circuit for driving a load. The electronic circuit includes a gate driver for providing an associated control signal to each of one or more switching elements coupled to the electronic circuit and the load. The one or more switching elements control a voltage applied to the load. A controller generates a speed signal based upon a received frequency demand signal and provides the speed signal to the gate driver. A zero crossing detector detects a zero crossing of a voltage applied to the load, and transitions a zero crossing signal between a first logic level and a second logic level based on the detected zero crossing. A position estimator estimates an angular position of the load, and includes a counter to count in a first predetermined direction based on the first logic level of the zero crossing signal, and to count in a second predetermined direction based on the second logic level of the zero crossing signal. An observer determines a value of the counter after a predetermined elapsed time, and generates an angular position signal based, at least in part, upon the determined value of the counter. The observer generates a frequency signal based, at least in part, upon the determined value of the counter and provides the frequency signal to the controller. The controller generates the speed signal based upon the received frequency demand signal and the frequency signal.

In an embodiment, the load comprises a brushless direct current (DC) motor having a plurality of windings. The one or more switching elements are coupled in a half-bridge circuit comprising at least one branch, each branch associated with a given one of the plurality of windings. Each branch includes a first switching element coupled between a high supply voltage and a switching node of the given winding, and a second switching element coupled between the switching node and a low supply voltage. The gate driver receives the angular position signal from the observer, and generates the control signal for each switching element based, at least in part, upon the angular position signal and the speed signal.

In an embodiment, the observer receives at least one adjustment parameter, and generates at least one of the angular position signal and the frequency signal based upon the determined value of the counter and the at least one adjustment parameter.

In an embodiment, the at least one adjustment parameter includes a frequency adjustment parameter, $K_I$, and a position adjustment parameter, $K_P$. The observer generates the frequency signal by multiplying the determined value of the counter by the frequency adjustment parameter, added to a previous value of the frequency signal. The observer generates the angular position signal by multiplying the determined value of the counter by the position adjustment parameter, added to a previous value of the angular position signal and added to the frequency signal.

In an embodiment, the angular position signal is determined by: $\theta(n)=\theta(n-1)+(K_P \cdot \text{ERROR})+\text{FREQ}(n)$, and the frequency signal is determined by: $\text{FREQ}(n)=\text{FREQ}(n-1)+(K_I \cdot \text{ERROR})$, where $\theta(n)$ is a current value of the angular position signal, $\theta(n-1)$ is the previous value of the angular position signal, $K_P$ is the position adjustment parameter, ERROR is the determined value of the counter, $\text{FREQ}(n)$ is a current value of the frequency signal, $\text{FREQ}(n-1)$ is the previous value of the frequency signal, and $K_I$ is the frequency adjustment parameter.

In an embodiment, the at least one adjustment parameter is determined based on one or more characteristics of the motor, and the one or more characteristics include a response time of the motor.

In an embodiment, the counter is an up/down counter configured to increment the value of the counter based on the first logic level of the zero crossing signal, and decrement the value of the counter based on the second logic level of the zero crossing signal. The first logic level is a logic high level, and the second logic level is a logic low level.

In an embodiment, if the determined value of the counter is a positive value, the frequency signal is increased, and if the determined value of the counter is a negative value, the frequency signal is decreased.

In an embodiment, the controller employs the frequency signal as a reference signal to compare to the received frequency demand signal to operate the load at a substantially constant frequency.

In an embodiment, the electronic circuit includes a center tap averaging block coupled to the zero crossing detector and a voltage applied to at least one of the windings. The center tap averaging block generates an approximate center tap voltage of the windings, and the zero crossing detector detects a zero crossing based upon the approximate center tap voltage.

Another aspect provides a method for controlling operation of a brushless direct current (DC) motor having a plurality of windings. The method includes providing an associated control signal to each of one or more switching elements coupled to the electronic circuit. The one or more switching elements control a voltage applied to each of the plurality of windings of the motor. A controller generates a speed signal based upon a received frequency demand signal and provides the speed signal to the gate driver. A zero crossing detector detects a zero crossing of a voltage applied to at least one of the windings, and transitions a zero crossing signal between a first logic level and a second logic level based on the detected zero crossing. A position estimator estimates an angular position of the motor. The position estimator includes a counter configured to count in a first predetermined direction based on the first logic level of the zero crossing signal, and configured to count in a second predetermined direction based on the second logic level of the zero crossing signal. An observer determines a value of the counter after a predetermined elapsed time, and generates an angular position signal based, at least in part, upon the determined value of the counter.

In an embodiment, the one or more switching elements are coupled in a half-bridge circuit including at least one branch. Each branch is associated with a given one of the plurality of windings, and includes a first switching element coupled between a high supply voltage and a switching node of the given winding, and a second switching element coupled between the switching node and a low supply voltage.

In an embodiment, the control signal for each switching element is generated based, at least in part, upon the angular position signal and the speed signal.

In an embodiment, a frequency signal is generated based, at least in part, upon the determined value of the counter and provide the frequency signal to the controller.

In an embodiment, the speed signal is generated based upon the received frequency demand signal and the frequency signal.

In an embodiment, at least one of the angular position signal and the frequency signal are generated based upon the determined value of the counter and at least one adjustment parameter.

In an embodiment, the at least one adjustment parameter includes a frequency adjustment parameter, $K_f$, and a position adjustment parameter, $K_P$. The frequency signal is generated by multiplying the determined value of the counter by the frequency adjustment parameter, added to a previous value of the frequency signal. The angular position signal is generated by multiplying the determined value of the counter by the position adjustment parameter, added to a previous value of the angular position signal and added to the frequency signal.

In an embodiment, a slope of the frequency signal is adjusted based upon the frequency adjustment parameter, and a slope of the angular position signal is adjusted based upon the position adjustment parameter.

In an embodiment, the at least one adjustment parameter is determined based on one or more characteristics of the motor. In an embodiment, the one or more characteristics comprise a response time of the motor.

In an embodiment, the value of the counter is incremented based on the first logic level of the zero crossing signal, and decremented based on the second logic level of the zero crossing signal. The first logic level is a logic high level, and the second logic level is a logic low level.

In an embodiment, if the determined value of the counter is a positive value, the frequency signal is increased, and if the determined value of the counter is a negative value, the frequency signal is decreased. In an embodiment, the frequency signal is compared to the received frequency demand signal, and, based upon the comparison, the motor is operated at a substantially constant frequency.

In an embodiment, an approximate center tap voltage of the windings is generated and a zero crossing is detected based upon the approximate center tap voltage.

BRIEF DESCRIPTION OF THE DRAWING FIGURES

Other aspects, features, and advantages of the claimed subject matter will become more fully apparent from the following detailed description, the appended claims, and the accompanying drawings in which like reference numerals identify similar or identical elements. Reference numerals that are introduced in the specification in association with a drawing figure might be repeated in one or more subsequent figures without additional description in the specification in order to provide context for other features.

FIG. 7 is a flow diagram showing an illustrative operating process of the motor driver of FIG. 1 in accordance with illustrative embodiments; and FIG. 8 is a flow diagram showing an illustrative process for adjusting phase control signals of the motor driver of FIG. 1 in accordance with illustrative embodiments.

DETAILED DESCRIPTION

Described embodiments provide circuits, systems and methods for controlling operation of brushless direct current motors that include a plurality of windings. A gate driver provides control signals to switching elements that control a voltage applied to each of the windings of the motor. A zero crossing detector detects zero crossings of a voltage applied to the windings and transitions a zero crossing signal between a first logic level and a second logic level based on the detected zero crossings. A position estimator estimates an angular position of the motor, and counts in a first direction based on the first logic level of the zero crossing signal, and in a second direction based on the second logic level of the zero crossing signal. An observer determines a value of the counter after an elapsed time, and generates an angular position signal based upon the value of the counter.

Figure 1:
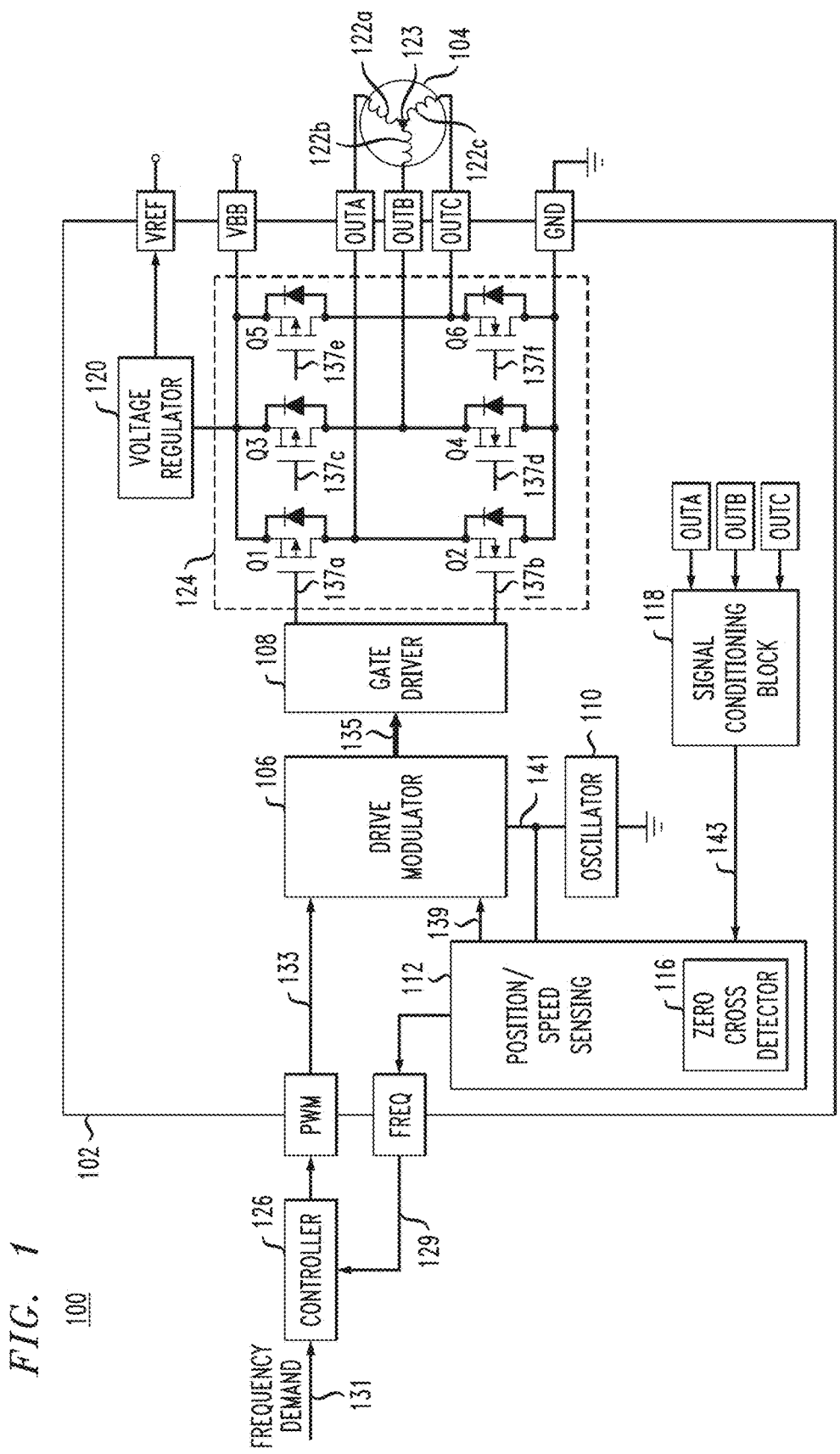
FIG. 1 is a schematic diagram showing a motor driver with a zero crossing detector in accordance with illustrative embodiments.

Referring to FIG. 1, a schematic of illustrative motor system 100 is shown. Motor system 100 includes motor driver 102 to control operation of multi-phase motor 104. Although shown in FIG. 1 as being a three-phase motor, in some embodiments, motor 104 could employ other numbers of phases, as would be understood by one of ordinary skill in the art.

When motor 104 is a three-phase motor, the motor includes three windings, shown as windings 122a, 122b and 122c, each of which, as would be understood by one of skill in the art, can be depicted as an equivalent circuit having an inductor in series with a back electromotive force (EMF) voltage source. As shown in FIG. 1, each winding 122a, 122b, and 122c is joined in a Y configuration at a common point shown as center tap 123. The voltage of the back EMF voltage source is directly observable when the current through the associated motor winding is zero. Thus, zero crossing information might beneficially be employed to determine back EMF and, therefore, also a direction of motion and position of motor 104.

Motor system 100 includes controller 126 coupled to receive frequency demand signal 131 from an external device coupled to motor system 100. In various embodiments, controller 126 may be either internal or external to motor driver 102. In general, frequency demand signal 131 is indicative of a requested speed of motor 104. Frequency demand signal 131 may be provided in one of a variety of formats, for example, a Single Edge Nibble Transmission (SENT) format, a Serial Peripheral Interface (SPI) format, a Local Interconnect Network (LIN) format, a CAN (Controller Area Network) format, an Inter-Integrated Circuit (I²C) format, a pulse width modulated (PWM) signal, or other similar signal formats.

Controller 126 provides a frequency demand signal 133 to drive modulator 106. Drive modulator 106 generates signals 135 to control gate driver 108 for each phase of motor 104. In some embodiments, drive modulator 106 generates signals 135 with a modulation characteristic (i.e., a relative time-varying duty cycle).

Gate driver 108 receives signals 135 and generates transistor drive signals 137a, 137b, 137c, 137d, 137e and 137f (collectively, transistor drive signals 137) to drive corresponding switching elements, shown as field effect transistors (FETs) Q1, Q2, Q3, Q4, Q5, and Q6. Together, transistors Q1 and Q2 form a half-bridge circuit that generates motor control signal OUTA corresponding to a first phase, A, of motor 104. Similarly, transistors Q3 and Q4 form a half-bridge circuit that generates motor control signal OUTB corresponding to a second phase, B, of motor 104, and transistors Q5 and Q6 form a half-bridge circuit that generates motor control signal OUTC corresponding to a third phase, C, of motor 104.

Although transistors Q1, Q2, Q3, Q4, Q5 and Q6 are shown as being an N-channel metal oxide semiconductor field effect transistors (MOSFETs), other types of switching elements may be employed, such as P-channel MOSFETs, bipolar junction transistors (BJTs), Silicon-Controlled Rectifiers (SCRs), thyristors, triacs, or other similar switching elements. When MOSFETs are employed, each transistor has a corresponding intrinsic body diode as shown in FIG. 1. Each body diode is arranged from drain (cathode) to source (anode) of the MOSFET, making the MOSFET able to block current in only one direction. The body diodes are thus frequently utilized as freewheeling diodes for inductive loads, such as motor 104, for example when the MOSFET is used as a switch in a half-bridge circuit.

The six transistors Q1, Q2, Q3, Q4, Q5 and Q6 are synchronized to operate in saturation to provide three motor drive signals OUTA, OUTB and OUTC to motor 104. In some embodiments, such as shown in FIG. 1, transistors Q1, Q2, Q3, Q4, Q5 and Q6 may be internal to motor driver 102. In other embodiments, transistors Q1, Q2, Q3, Q4, Q5 and Q6 may be external devices coupled to motor driver 102.

Motor driver 102 includes position and speed sensing circuit 112 to generate a position reference signal 139 indicative of a rotational reference position of motor 104. In some embodiments, position and speed sensing circuit 112 includes, or is coupled to, zero crossing detector 116. Zero crossing detector 116 is coupled to receive one or more center tap signals 143 from signal conditioning block 118. Signal conditioning block 118 is coupled to receive at least one of the motor drive signals (e.g., at least one of OUTA, OUTB, and OUTC). Zero crossing detector 116 generates at least one signal indicative of a zero crossing of the voltage applied to one or more of the windings of motor 104. As will be described, the zero crossing signal can be used by position and speed sensing circuit 112 to estimate a position and/or back EMF of motor 104. Described embodiments do not employ Hall effect elements or other magnetic field sensing elements disposed within motor 104 to detect the rotational position of motor 104.

Drive modulator 106 is coupled to receive a position reference signal 139 from position and speed sensing circuit 112. Drive modulator 106 and position and speed sensing circuit 112 are also coupled to oscillator 110 to receive a local reference frequency signal 141. In some embodiments, position and speed sensing circuit 112 generates a frequency reference signal 129 based upon zero crossings detected by zero cross detector 116 and local reference frequency signal 141. Controller 126 is coupled to receive frequency reference signal 129.

In some embodiments, drive modulator 106 can modify control signals 135 to gate driver circuit 108 based, at least in part, upon position reference signal 139 and frequency demand signal 133. Thus, in some embodiments, motor driver 102 can automatically adjust a timing (i.e., a phase) of the transistor drive signals 137 in relation to a sensed rotational position and sensed rotational frequency of motor 104.

For example, drive modulator 106 might control the speed, position and direction of motor 104 based upon position reference signal 139 and frequency demand signal 133. Some embodiments of motor driver 102 might also provide for driving motor 104 in a phase advance mode to reduce a back electromotive force of the motor and align a phase of the current through motor 104 and a phase of a voltage applied to motor 104 (e.g., align a phase of the current of motor drive signals OUTA, OUTB and OUTC and a phase of the voltage of motor drive signals OUTA, OUTB and OUTC, respectively).

Motor driver 102 receives a power supply voltage VBB, which is also supplied to motor 104 through transistors Q1, Q3 and Q5 during times when transistors Q1, Q3 and Q5 are turned on. Motor driver 102 also receives a ground (or circuit common) supply voltage GND, which is supplied to motor 104 through transistors Q2, Q4 and Q6 during times when transistors Q2, Q4 and Q6 are turned on. It will be understood that there can be a small voltage drop (for example, 0.1 volts) through transistors Q1, Q2, Q3, Q4, Q5 and Q6 when they are turned on and supplying current to motor 104.

Current is provided to motor 104 by turning on an upper transistor (e.g., one of transistors Q1, Q3 and Q5) in a given half-bridge circuit to couple supply voltage VBB though the upper transistor to motor 104, and turning on a lower transistor (e.g., one of transistors Q2, Q4 and Q6) in another half-bridge circuit to couple ground voltage GND though the lower transistor to motor 104, allowing current to flow through one or more corresponding windings of motor 104. For example, if upper transistor Q1 is turned on (e.g., control signal 137a is logic high), then one of lower transistors Q4 and Q6 could be turned on (e.g., one of control signals 137d or 137f is logic high) to allow a current to flow through associated windings of motor 104 (e.g., windings 122a and 122b, or windings 122a and 122c).

To prevent short circuit (or "shoot through") conditions, only one transistor in each half-bridge circuit can be turned on at a given time. As a precaution, gate driver circuit 108 might control transistor drive signals 137 such that for short periods of time after one of the transistors of a given half-bridge circuit turns off, the other transistor cannot turn on and, thus, both transistors are off. This time is commonly known as "dead time" of the half-bridge circuit. For the illustrative system shown in FIG. 1, during dead time for each half-bridge circuit, the upper transistor (e.g., transistors Q1, Q3 and Q5) and the lower transistor (e.g., transistors Q2, Q4 and Q6) are both off (e.g., transistor drive signals 137a and 137b are both logic low, transistor drive signals 137c and 137d are both logic low, and transistor drive signals 137e and 137f are both logic low).

Figure 2:
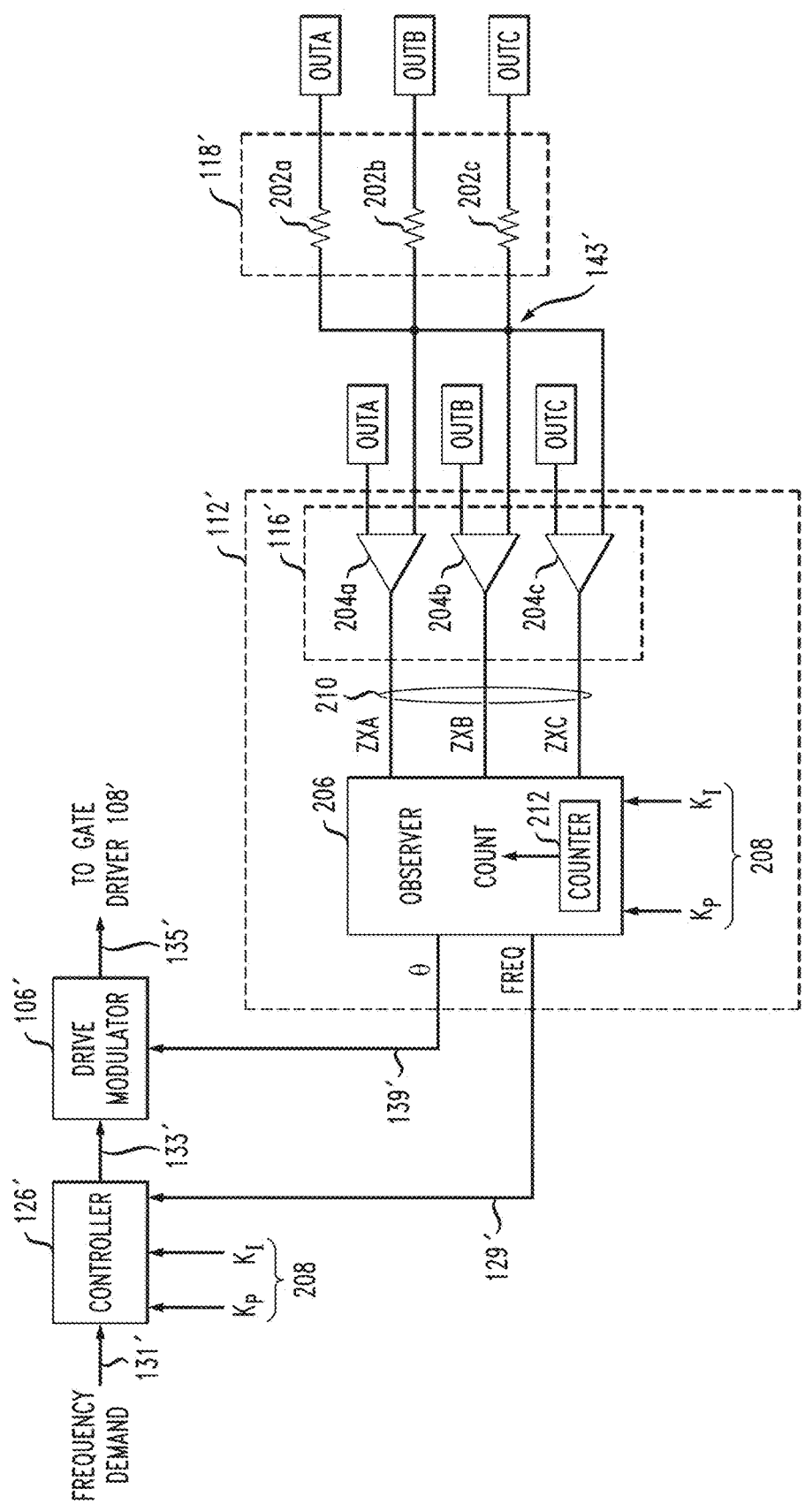
FIG. 2 is a block diagram of a position and speed sensing circuit of the motor driver of FIG. 1 in accordance with illustrative embodiments.

Referring to FIG. 2, a block diagram showing additional detail of position and speed sensing circuit 112 and signal conditioning block 118 is shown. As shown in FIG. 2, the motor control signals (OUTA, OUTB, and OUTC, for a three phase motor 104) are provided to signal conditioning block 118'. In some embodiments, signal conditioning block 118' may be implemented as an averaging block of resistors to approximate the center tap of a load structure (e.g., to approximate center tap 123 of motor 104). For example, as shown in FIG. 2, signal conditioning block 118' includes resistors 202a, 202b and 202c. One terminal of each of resistors 202a, 202b and 202c is coupled to motor drive signals OUTA, OUTB and OUTC, respectively. The other terminals of resistors 202a, 202b, and 202c are coupled together to generate center tap signal 143'.

Position and speed sensing circuit 112' includes zero cross detector 116' and observer circuit 206. Zero cross detector 116' includes comparators 204a, 204b and 204c. Center tap signal 143' is provided to an input of each of comparators 204a, 204b and 204c. In an illustrative embodiment, motor drive signal OUTA is provided to another input of comparator 204a, motor drive signal OUTB is provided to another input of comparator 204b, and motor drive signal OUTC is provided to another input of comparator 204c. Although not shown in FIG. 2, each comparator 204 may also receive a power supply signal (e.g., VBB of FIG. 1) and a ground signal (e.g., GND of FIG. 1). For example, comparators 204 may be "rail-to-rail" comparators (e.g., from GND to VBB).

Thus, comparators 204a, 204b, and 204c compare center tap signal 143' to motor drive signals OUTA, OUTB, and OUTC, respectively. Thus, each comparator 204 is between a respective phase voltage (e.g., OUTA, OUTB, and OUTC) and the approximated center tap of motor 104 (e.g., center tap signal 143'). Comparators 204a, 204b and 204c generate zero cross output signals ZXA, ZXB and ZXC, respectively, which are collectively shown as zero cross signals 210. In some embodiments, zero cross signals 210 output from comparators 204 are digital signals having a logic high value when the respective motor control signal (e.g., OUTA, OUTB or OUTC) is greater than center tap signal 143', and having a logic low value when the respective motor control signal (e.g., OUTA, OUTB or OUTC) is less than center tap signal 143'.

By comparing motor control signals OUTA, OUTB, and OUTC with center tap signal 143', a zero crossing point of the motor back EMF for each phase (e.g., each winding 122) can be determined. The back EMF for each winding is a voltage opposing the voltage of the motor control signals (e.g., OUTA, OUTB, and OUTC) that is proportional to the speed of the motor. Knowing when back EMF zero crossing points occur is indicative of an angular position of motor 104 (e.g., of a position of a moving element (rotor) of motor 104 relative to a stationary element (stator) of motor 104).

Observer circuit 206 is coupled to receive zero cross signals 210 from zero cross detector 116'. Observer circuit 206 also receives a frequency adjustment parameter, $K_I$, and a position adjustment parameter, $K_P$, collectively shown as adjustment signals 208. Adjustment signals 208 may also be provided to controller 126'. Based upon zero cross signals 210, observer circuit 206 determines an electrical frequency of motor 104 and an angular position of motor 104 (e.g., an angular position of a moving element (rotor) of motor 104 relative to a stationary element (stator) of motor 104). Once the frequency and angular position of motor 104 are determined, signals 135' to control gate driver 108' for each phase of motor 104 can be synchronized, for example to drive motor 104 at a substantially constant frequency, regardless of changes to supply voltage VBB.

Observer circuit 206 includes counter 212, which generates an output value, COUNT. In some embodiments, zero cross signals 210 (e.g., the ZXA signal, the ZXB signal, and the ZXC signal) are provided to counter 212. Alternatively, in some embodiments, each of the ZXA signal, the ZXB signal, and the ZXC signal may be provided to one or more separate counters included in counter 212. In an illustrative embodiment, counter 212 is an up/down counter that counts up or down based upon the value of zero cross signals 210. As will be described, when counter 212 is an up/down counter, the output value COUNT is incremented (e.g., counts up) when a respective one of zero cross signals 210 (e.g., ZXA) is a logic low value and the output value COUNT is decremented (e.g., counts down) when a respective one of zero cross signals 210 (e.g., ZXA) is a logic high value. As will be described, the output value, COUNT, may be determined for a given "count sector" during operation of motor driver 102.

Observer circuit 206 may generate a frequency signal (FREQ) 129' and angular position signal (θ) 139' based upon zero cross signals 210, adjustment signals 208 and COUNT. As will be described, frequency signal (FREQ) 129' may correspond to a determined frequency of motor 104, and angular position signal (θ) 139' may correspond to a determined angular position of motor 104. Frequency signal (FREQ) 129' is provided to controller 126' and an angular position signal (θ) 139' is provided to drive modulator 106'.

In some embodiments, such as shown in FIG. 2, controller 126' may generate frequency demand signal 133' based upon received frequency demand signal 131', adjustment signals 208, and frequency signal (FREQ) 129'. Controller 126' provides frequency demand signal 133' to drive modulator 106. Drive modulator 106 receives angular position signal (θ) 139' and generates signals 135' to control gate driver 108' for each phase of motor 104, for example, based upon frequency demand signal 133' and angular position signal (θ) 139'.

FIGS. 3A-B, 4A-D, 5 and 6 show timing diagrams to aid in understanding operation of motor system 100. As shown in FIGS. 1 and 2, described embodiments drive a brushless direct current (BLDC) motor (e.g., motor 104 of FIG. 1) without having Hall elements or other sensors in motor 104 to determine the motor position (e.g., sensorless operation). Further, described embodiments do not employ sense resistors in the current path for each winding 122 of motor 104 (e.g., there are not resistors in series with one or more of windings 122 of motor 104 to generate a sense voltage).

For simplicity, the timing diagrams are shown for drive modulator 106 generating trapezoidal motor control signals (e.g., motor driver 102 operating in a trapezoidal mode with motor control signals OUTA, OUTB and OUTC being generally trapezoidal in shape), although other embodiments may employ other control schemes (e.g., motor driver operating in a sinusoidal mode with motor control signals OUTA, OUTB and OUTC being sinusoidal in shape, etc.).

Figure 3B:
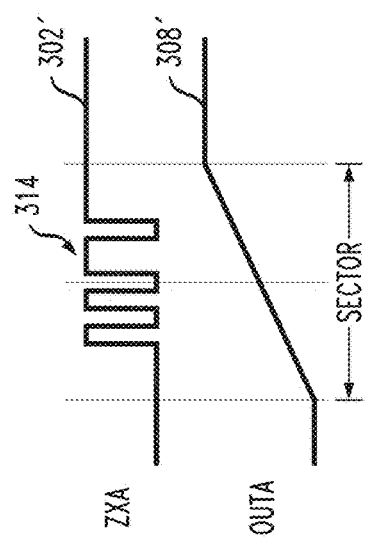
FIGS. 3A and 3B are timing diagrams showing illustrative signals of the motor driver of FIG. 1 in accordance with illustrative embodiments.
Figure 3A:
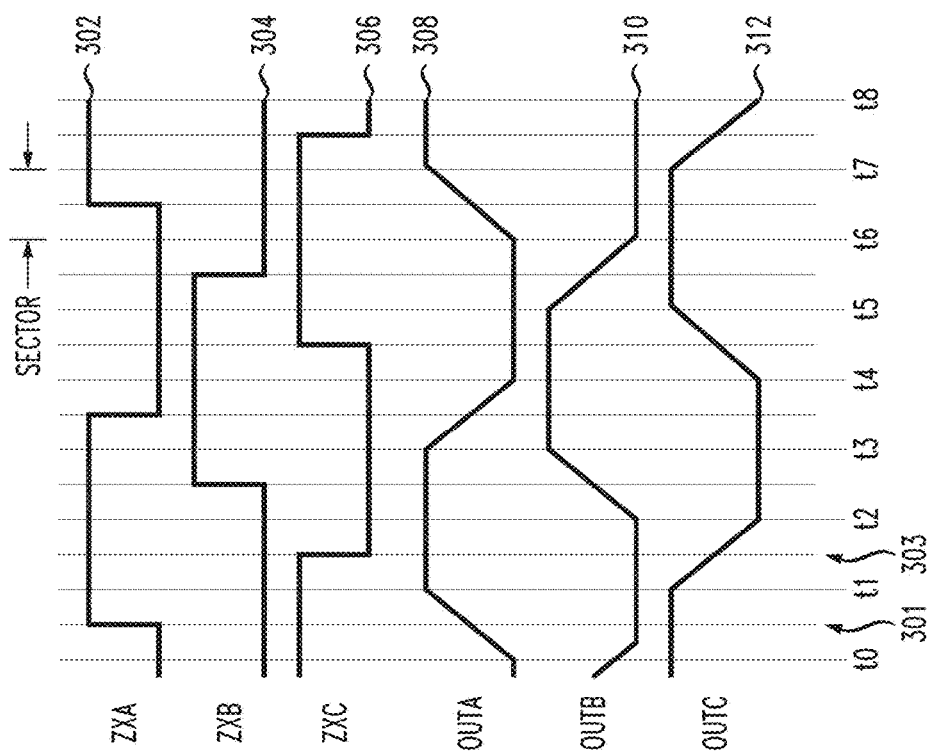

Referring to FIG. 3A, a timing diagram of zero cross signals 210 (e.g., ZXA, ZXB and ZXC) is shown in relation to motor control signals OUTA, OUTB and OUTC. An illustrative waveform of zero cross signal ZXA is shown as curve 302, an illustrative waveform of zero cross signal ZXB is shown as curve 304, and an illustrative waveform of zero cross signal ZXC is shown as curve 306. An illustrative waveform of motor control signal OUTA is shown as curve 308, an illustrative waveform of motor control signal OUTB is shown as curve 310, and an illustrative waveform of motor control signal OUTC is shown as curve 312.

As shown, one or more count sectors occur within time intervals between indicated times t0, t1, t2, t3, t4, t5, t6, t7 and t8. As shown, at time t0, when a first count sector may start, motor control signal OUTA is logic low and zero cross signal ZXA, corresponding to motor control signal OUTA, is also logic low. Similarly, at time t0, motor control signal OUTB is nearly logic low, and zero cross signal ZXB, corresponding to motor control signal OUTB, is logic low, and motor control signal OUTC is logic high, and zero cross signal ZXC, corresponding to motor control signal OUTC, is also logic high.

At time t1, the first count sector may complete and a second count sector may start. At time t1, motor control signal OUTA has become logic high and zero cross signal ZXA, corresponding to motor control signal OUTA, is also logic high. Zero cross signal ZXA may transition between logic low and logic high during the count sector, for example at a time indicated by line 301. For example, motor control signal OUTA may transition between approximately GND (e.g., approximately 0V) and approximately VBB, and zero cross signal ZXA may transition from logic low to logic high when OUTA is approximately VBB/2, as shown. At time t1, motor control signal OUTB is still logic low and motor control signal OUTC is still logic high, so zero cross signals ZXB and ZXC remain logic low and logic high, respectively.

At time t2, the second count sector may complete and a third count sector may start. At time t2, motor control signal OUTA and zero cross signal ZXA remain logic high. At time t2, motor control signal OUTB and zero cross signal ZXB remain logic low. Motor control signal OUTC has become logic low, and zero cross signal ZXC has also become logic low. Zero cross signal ZXC may transition between logic high and logic low during the count sector, for example at a time indicated by line 303. For example, motor control signal OUTC may transition between approximately VBB and approximately GND (e.g., approximately 0V), and zero cross signal ZXC may transition from logic high to logic low when OUTC is approximately VBB/2, as shown. Operation of zero cross signals ZXA, ZXB and ZXC continues as described for one or more subsequent count sectors during operation of motor driver 102.

FIG. 3B shows a magnified view of a transition of a zero cross signal (ZXA) in relation to the corresponding motor control signal (OUTA). As shown by curve 302', a given zero cross signal, zero cross signal ZXA in this example, may have one or more transition glitches or commutations, shown as glitches 314, as motor control signal OUTA, shown by curve 308', increases between low and high voltages (or vice versa). For example, when the voltage of OUTA is near the value of center tap signal 143', the output of comparator 204a, ZXA, may transition multiple times as OUTA passes the trigger point set by center tap signal 143'. Such glitches may be caused by, for example, PWM switching signals, ringing of motor windings, and other transient conditions of motor system 100. Thus, in a given count sector, zero cross signal ZXA may have one or more transitions between logic levels. Such glitches could lead motor driver 102 to inaccurately determine the angular position and frequency of motor 104 and, in turn, inaccurately adjust frequency demand signal 133. As will be described, observer circuit 206 employs the COUNT value generated by counter 212 to reduce, or ideally eliminate, the effect glitches in the zero cross signals have on determining the angular position and frequency of motor 104. Employing the COUNT value may eliminate the need to use blanking time (e.g., time when all of switching elements 137 are off) to determine the back EMF of motor 104.

FIGS. 4A-4D show illustrative timing diagrams of a zero cross signal (e.g., ZXA) in relation to the COUNT value during an illustrative count sector. As described, the COUNT value is incremented or decremented during a count sector based upon the value of the zero cross signal (ZXA in the example shown in FIGS. 4A-4D). For example, a count sector may start during an un-driven portion of the associated phase (e.g., the associated motor control signal, OUTA in the example shown in FIGS. 4A-4D, is a logic low value). A count sector has a predetermined time duration, indicated as the duration between time t0 and time t1. In some embodiments, the time duration of a count sector may be set based upon the expected midpoints of the zero cross signals (e.g., an expected frequency of motor 104). Although shown in FIGS. 4A-4D as being related only to ZXA, some embodiments may employ a COUNT value related to ZXB or ZXC. Some embodiments may employ a plurality of COUNT values, for example a COUNT value associated with each zero cross signal ZXA, ZXB, and ZXC. Other embodiments may employ a single COUNT value for all zero cross signals ZXA, ZXB, and ZXC.

At the beginning of a count sector, the COUNT value is incremented or decremented from an initial value (e.g., 0) based upon the logic level of the zero cross signal (e.g., incremented when the zero cross signal is logic high, and decremented when the zero cross signal is logic low). At the end of the count sector, the COUNT value is determined. If the COUNT value has not returned to its initial value (e.g., 0), then the zero cross signal did not transition between logic levels in the center of the count sector and, thus, the estimated frequency and angular position of motor 104 are incorrect. The COUNT value at the end of the count sector is proportional to the number of up- and down-counts of the angle variable. The difference between the COUNT value at the end of the count sector and the initial COUNT value (e.g., 0) may be used as an ERROR value. The ERROR value may, in turn, be used by observer circuit 206 to adjust the estimated frequency and angular position of motor 104 (e.g., via frequency signal (FREQ) 129' and angular position signal (θ) 139'). After the ERROR value is determined, the COUNT value may be reset to the initial value (e.g., 0) to start a subsequent count sector.

At the end of each count sector, the estimated frequency and angular position of motor 104 (e.g., via frequency signal (FREQ) 129' and angular position signal (θ) 139') are updated. Note that phase is the integral of frequency. In illustrative embodiments, the estimated frequency is equal to a previous estimated frequency value (e.g., for a previous count sector) plus the ERROR value. In some embodiments, the ERROR value may be multiplied by frequency adjustment parameter, $K_I$, and the product may be added to the previous estimated frequency value. In illustrative embodiments, the estimated angular position is equal to the current estimated frequency value plus the ERROR value plus the previous estimated angular position. In some embodiments, the ERROR value may be multiplied by position adjustment parameter, $K_P$, and the product may be added to the current estimated frequency value and the previous estimated angular position. For example, the current estimated frequency, FREQ(n), may be given by: $FREQ(n)=FREQ(n-1)+(K_I \cdot ERROR)$, and the current angular position, θ(n), may be determined by: $\theta(n)=\theta(n-1)+(K_P \cdot ERROR)+FREQ(n)$, and, where θ(n−1) is the previous value of the angular position and FREQ(n−1) is the previous value of the estimated frequency.

The frequency adjustment parameter, $K_I$, and position adjustment parameter, $K_P$, may be adjustable to accommodate a wide variety of loads (e.g., to accommodate different properties of motor 104). For example, properties of motor 104 may change based upon a size or type of motor 104. For example, a high value of position adjustment parameter, $K_P$, allows larger changes in the estimated angular position each count sector, which may allow the position to be accurately synchronized more quickly, for example at initial start-up of motor system 100. Similarly, a high value of frequency adjustment parameter, $K_I$, allows larger changes in the estimated frequency each count sector, which may allow the estimated frequency to be accurately synchronized more quickly, for example at initial start-up of motor system 100. Some embodiments may adjust the values of frequency adjustment parameter, $K_I$, and position adjustment parameter, $K_P$, during operation of motor system 100, for example to allow coarser adjustment of the estimated frequency and estimated angular position at initial start-up of motor system 100, and then allow finer adjustment of the estimated frequency and estimated angular position after operating time of motor system 100. Thus, frequency adjustment parameter, and position adjustment parameter, $K_P$, are the steps by which to adjust the estimated frequency and angular position to correct for the ERROR value, and therefore adjust the convergence speed of the control loop of motor system 100.

Figure 4A:
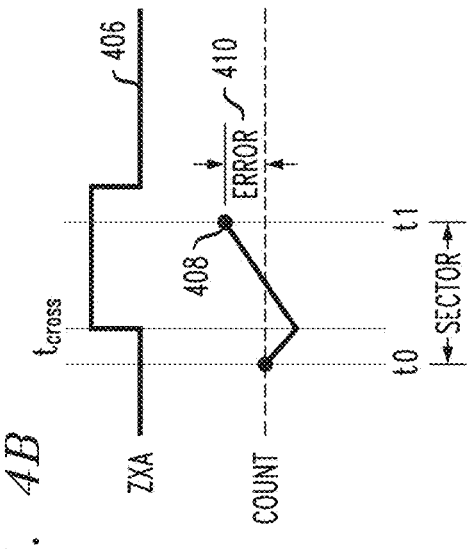
FIGS. 4A, 4B, 4C and 4D are timing diagrams showing illustrative signals of the position and speed sensing circuit of FIG. 2 in accordance with illustrative embodiments.

FIG. 4A shows an illustrative timing diagram of the ZXA signal, shown as curve 402, and an illustrative plot of the COUNT value, shown as curve 404. As shown in FIG. 4A, when a zero cross occurs in the center of the count sector (at time $t_{cross}$), the COUNT value returns to the initial value at the end of the count sector (at time t1). As shown, at the start of the count sector (at time t0), the COUNT value is decremented from an initial value while ZXA is logic low. At time $t_{cross}$, a zero cross of OUTA is detected, and ZXA transitions from logic low to logic high, and the COUNT value is incremented until the end of the count sector at time t1. In the illustrative condition shown in FIG. 4A, time $t_{cross}$ occurs in the middle of the count sector and, thus, the COUNT value returns to the initial value at the end of the count sector at time t1. Thus, there is no ERROR value, and observer circuit 206 updates the estimated frequency and angular position of motor 104 (e.g., via frequency signal (FREQ) 129' and angular position signal (θ) 139') without making an ERROR adjustment. In other words, the estimated frequency and angular position of motor 104 was correct for the count sector.

The angular position variable changes even though ERROR=0 because the previous angular position value is summed with the previous frequency variable in order to determine the new angular position. In steady-state operation of motor 104, the ERROR value is ideally 0 at the end of each count sector, since, at steady-state, the frequency remains substantially constant. The angular position is updated to reflect the rotation of motor 104 (e.g., the position of the moving rotor). Thus, for the illustrative conditions shown in FIG. 4A, FREQ(n)=FREQ(n−1), and θ(n)=θ(n−1)+FREQ (n) since ERROR=0.

Figure 4B:
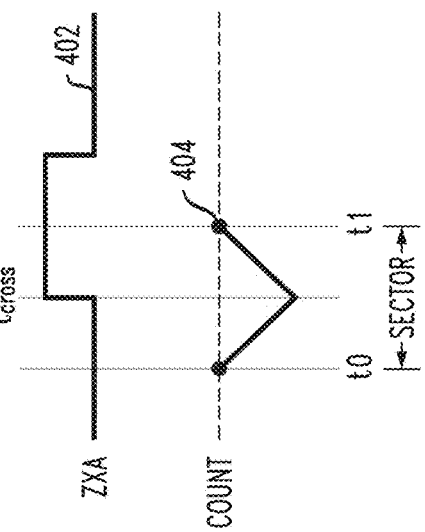

FIG. 4B shows another illustrative timing diagram of the ZXA signal, shown as curve 406, and an illustrative plot of the COUNT value, shown as curve 408. As shown in FIG. 4B, when a zero cross occurs before the center of the count sector (at time $t_{cross}$), the COUNT value exceeds the initial value at the end of the count sector (at time t1). As shown, at the start of the count sector (at time t0), the COUNT value is decremented from an initial value while ZXA is logic low. At time $t_{cross}$, a zero cross of OUTA is detected, and ZXA transitions from logic low to logic high, and the COUNT value is incremented until the end of the count sector at time t1. In the illustrative condition shown in FIG. 4B, time $t_{cross}$ occurs earlier than the middle of the count sector and, thus, the COUNT value has a non-zero value at the end of the count sector at time t1, since the COUNT value is incremented for a longer portion of the count sector. Thus, the ERROR value has a positive value, shown as ERROR value 410, which is the difference between the initial value of COUNT and the value of COUNT at the end of the count sector. Observer circuit 206 updates the estimated frequency and angular position of motor 104 (e.g., via frequency signal (FREQ) 129' and angular position signal (θ) 139'), making an ERROR adjustment. In other words, the estimated frequency and angular position of motor 104 were inaccurate for the count sector, meaning the speed (e.g., frequency) of motor 104 changed from the previous count sector.

The angular position variable changes because the previous angular position value is summed with the previous frequency variable and summed with the ERROR value, adjusted by the position adjustment parameter, $K_P$, in order to determine the new angular position. The angular position is updated to reflect the rotation of motor 104 (e.g., the position of the moving rotor). Thus, for the illustrative conditions shown in FIG. 4B, the current frequency FREQ(n)=FREQ(n−1)+($K_I$·ERROR), and the current angular position θ(n)=θ(n−1)+($K_P$·ERROR)+FREQ(n), since ERROR≠0.

Figure 4C:
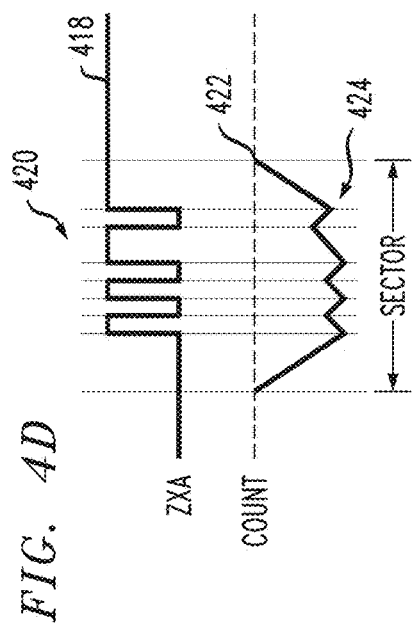

FIG. 4C shows another illustrative timing diagram of the ZXA signal, shown as curve 412, and an illustrative plot of the COUNT value, shown as curve 416. As shown in FIG. 4B, when a zero cross occurs after the center of the count sector (at time $t_{cross}$), the COUNT value does not reach the initial value at the end of the count sector (at time t1). As shown, at the start of the count sector (at time t0), the COUNT value is decremented from an initial value while ZXA is logic low. At time $t_{cross}$, a zero cross of OUTA is detected, and ZXA transitions from logic low to logic high, and the COUNT value is incremented until the end of the count sector at time t1. In the illustrative condition shown in FIG. 4C, time $t_{cross}$ occurs later than the middle of the count sector and, thus, the COUNT value has a non-zero value at the end of the count sector at time t1, since the COUNT value is decremented for a longer portion of the count sector. Thus, the ERROR value has a negative value, shown as ERROR value 414, which is the difference between the initial value of COUNT and the value of COUNT at the end of the count sector. Observer circuit 206 updates the estimated frequency and angular position of motor 104 (e.g., via frequency signal (FREQ) 129' and angular position signal (θ) 139'), making an ERROR adjustment. In other words, the estimated frequency and angular position of motor 104 were inaccurate for the count sector, meaning the speed (e.g., frequency) of motor 104 changed from the previous count sector.

The angular position variable changes because the previous angular position value is summed with the previous frequency variable and summed with the ERROR value, adjusted by the position adjustment parameter, $K_P$, in order to determine the new angular position. The angular position is updated to reflect the rotation of motor 104 (e.g., the position of the moving rotor). Thus, for the illustrative conditions shown in FIG. 4C, the current frequency FREQ(n)=FREQ(n−1)+($K_I$·ERROR), and the current angular position θ(n)=θ(n−1)+($K_P$·ERROR)+FREQ(n), since ERROR≠0.

Figure 4D:
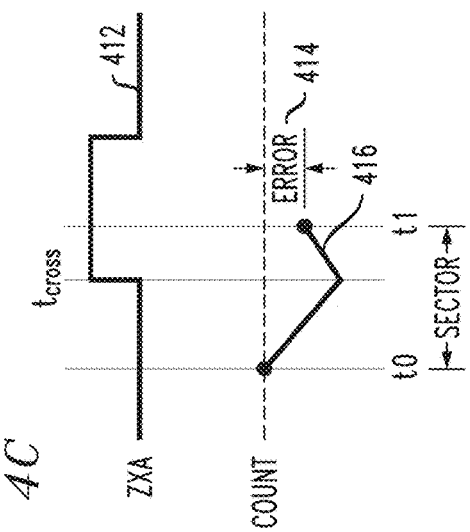

FIG. 4D shows an illustrative timing diagram of the ZXA signal, shown as curve 418, and an illustrative plot of the COUNT value, shown as curve 422. Similarly as shown in FIG. 4A, FIG. 4D shows the condition where a zero cross occurs in the center of the count sector (at time $t_{cross}$). Thus, the COUNT value returns to the initial value at the end of the count sector (at time t1), such that there is no ERROR value. As described in regard to FIG. 3B, zero cross signal ZXA may have one or more transition glitches 420 as the OUTA signal passes the zero cross trigger point. Described embodiments reduce the effect of the glitches by integrating them via counter 212, which averages the glitches and provides a robust zero cross detection without employing blanking time.

Figure 5:
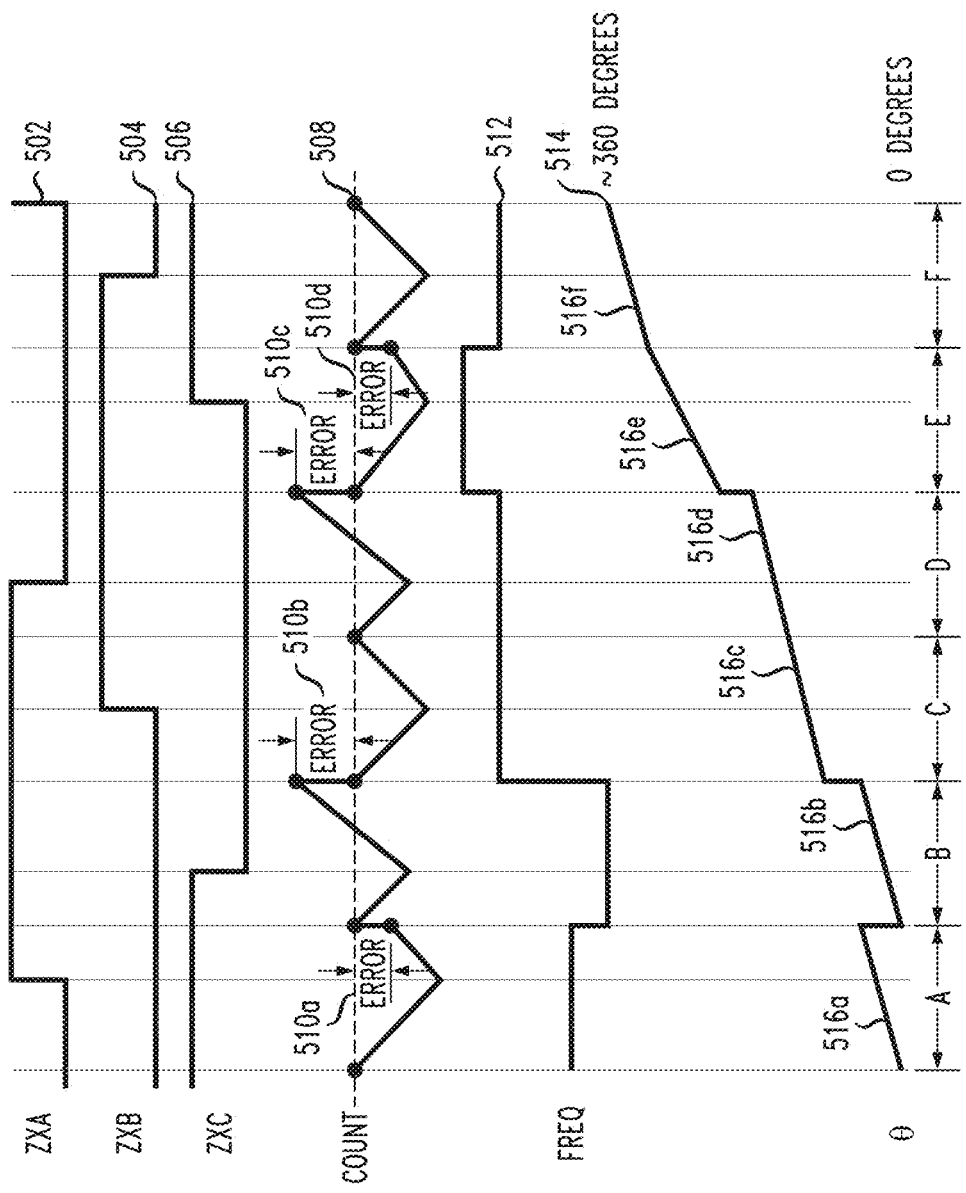
FIG. 5 is a timing diagram showing illustrative signals of the position and speed sensing circuit of FIG. 2 in accordance with illustrative embodiments.

FIG. 5 shows an illustrative timing diagram showing the COUNT value (curve 508) in relation to zero cross signals ZXA (curve 502), ZXB (curve 504), and ZXC (curve 506), as well as the estimated frequency, FREQ (curve 512), and the estimated angular position, θ (curve 514). As can be seen from FIG. 5, the angular position signal, θ, corresponds to the integral of the frequency signal, FREQ, and the slope of the angular position signal, θ, corresponds to the speed of motor 104. As shown in FIG. 5, the angular position signal, θ, measures the angular position of motor 104 from 0 degrees to approximately 360 degrees (e.g., a full rotation) based on a number of degrees corresponding to each count sector.

The illustrative operating conditions shown in FIG. 5 correspond to six count sectors, shown as count sectors A-F. In count sectors A and D, zero cross signal ZXA is being monitored by observer circuit 206 (e.g., COUNT corresponds to ZXA). In count sectors B and E, zero cross signal ZXC is being monitored by observer circuit 206 (e.g., COUNT corresponds to ZXC). In count sectors C and F, zero cross signal ZXB is being monitored by observer circuit 206 (e.g., COUNT corresponds to ZXB). At the end of each count sector, the ERROR value is determined, and the COUNT value is reset to the initial value.

In count sector A, observer circuit 206 is monitoring zero cross signal ZXA for a rising edge. Thus, while zero cross signal ZXA is logic low, the value of COUNT is decremented (e.g., counter 212 counts down from the initial value). When zero cross signal ZXA transitions to logic high, the value of COUNT is incremented (e.g., counter 212 counts up until the count sector ends). At the end of the count sector, an ERROR value is generated based upon any difference between the final COUNT value and the initial COUNT value. For example, as shown in the illustrative timing diagram of FIG. 5, ERROR 510a may be generated for count sector A, since the transition of zero cross signal ZXA occurred after the midpoint of count sector A. At the end of count sector A, the angular position, θ, and frequency, FREQ, of motor 104 are updated based upon the ERROR value (and any adjustment parameters). For example, the current frequency $FREQ(n)=FREQ(n-1)+(K_I \cdot ERROR)$, and the current angular position $\theta(n)=\theta(n-1)+(K_P \cdot ERROR)+FREQ(n)$, where the value of ERROR is based upon the value of the counter. In count sector A, the FREQ signal has a first value as shown by curve 512, and the angular position changes at a first rate (e.g., slope 516a) as shown by curve 514.

In count sector B, observer circuit 206 is monitoring zero cross signal ZXC for a falling edge. Thus, while zero cross signal ZXC is logic high, the value of COUNT is decremented (e.g., counter 212 counts down from the initial value). When zero cross signal ZXC transitions to logic low, the value of COUNT is incremented (e.g., counter 212 counts up until the count sector ends). At the end of the count sector, an ERROR value is generated based upon any difference between the final COUNT value and the initial COUNT value. For example, as shown in the illustrative timing diagram of FIG. 5, ERROR 510b may be generated for count sector B, since the transition of zero cross signal ZXC occurred before the midpoint of count sector B. At the end of count sector B, the angular position, θ, and frequency, FREQ, of motor 104 are updated (e.g., from the values determined for count sector A) based upon the ERROR value (and any adjustment parameters). For example, the current frequency $FREQ(n)=FREQ(n-1)+(K_I \cdot ERROR)$, and the current angular position $\theta(n)=\theta(n-1)+(K_P \cdot ERROR)+FREQ(n)$, where the value of ERROR is based upon the value of the counter. In count sector B, the FREQ signal has a second value, lower than the value during count sector A, as shown by curve 512 (since the frequency was reduced in response to the ERROR value determined for count sector A), and the angular position changes at a first rate (e.g., slope 516b) as shown by curve 514.

In count sector C, observer circuit 206 is monitoring zero cross signal ZXB for a rising edge. Thus, while zero cross signal ZXB is logic low, the value of COUNT is decremented (e.g., counter 212 counts down from the initial value). When zero cross signal ZXB transitions to logic high, the value of COUNT is incremented (e.g., counter 212 counts up until the count sector ends). At the end of the count sector, an ERROR value is generated based upon any difference between the final COUNT value and the initial COUNT value. For example, as shown in the illustrative timing diagram of FIG. 5, there is no ERROR value for count sector C, since the transition of zero cross signal ZXB occurred at the midpoint of count sector C. At the end of count sector C, the angular position, θ, and frequency, FREQ, of motor 104 are updated (e.g., from the values determined for count sector B). For example, the current frequency $FREQ(n)=FREQ(n-1)$, and the current angular position $\theta(n)=\theta(n-1)+FREQ(n)$, since ERROR=0. In count sector C, the FREQ signal has the same value as in count sector B, as shown by curve 512 (since ERROR=0), and the angular position changes at a rate (e.g., slope 516c) as shown by curve 514.

In count sector D, observer circuit 206 is monitoring zero cross signal ZXA for a falling edge. Thus, while zero cross signal ZXA is logic high, the value of COUNT is decremented (e.g., counter 212 counts down from the initial value). When zero cross signal ZXA transitions to logic low, the value of COUNT is incremented (e.g., counter 212 counts up until the count sector ends). At the end of the count sector, an ERROR value is generated based upon any difference between the final COUNT value and the initial COUNT value. For example, as shown in the illustrative timing diagram of FIG. 5, there is ERROR value 510c for count sector D, since the transition of zero cross signal ZXA occurred before the midpoint of count sector D. At the end of count sector D, the angular position, θ, and frequency, FREQ, of motor 104 are updated (e.g., from the values determined for count sector B). For example, the current frequency $FREQ(n)=FREQ(n-1)+(K_I \cdot ERROR)$, and the current angular position $\theta(n)=\theta(n-1)+(K_P \cdot ERROR)+FREQ(n)$, where the value of ERROR is based upon the value of the counter. In count sector D, the FREQ signal has the same value as in count sector B and C, as shown by curve 512, and the angular position changes at a rate (e.g., slope 516d) as shown by curve 514.

In count sector E, observer circuit 206 is monitoring zero cross signal ZXC for a rising edge. Thus, while zero cross signal ZXC is logic low, the value of COUNT is decremented (e.g., counter 212 counts down from the initial value). When zero cross signal ZXC transitions to logic high, the value of COUNT is incremented (e.g., counter 212 counts up until the count sector ends). At the end of the count sector, an ERROR value is generated based upon any difference between the final COUNT value and the initial COUNT value. For example, as shown in the illustrative timing diagram of FIG. 5, ERROR 510a may be generated for count sector E, since the transition of zero cross signal ZXC occurred after the midpoint of count sector E. At the end of count sector E, the angular position, θ, and frequency, FREQ, of motor 104 are updated based upon the ERROR value (and any adjustment parameters). For example, the current frequency FREQ(n)=FREQ(n−1)+($K_f$·ERROR), and the current angular position θ(n)=θ(n−1)+($K_P$·ERROR)+FREQ(n), where the value of ERROR is based upon the value of the counter. In count sector E, the FREQ signal has a fourth value as shown by curve 512 (adjusted by error 510c from count sector D), and the angular position changes at a rate (e.g., slope 516e) as shown by curve 514, which is increased due to ERROR 510c.

In count sector F, observer circuit 206 is monitoring zero cross signal ZXB for a falling edge. Thus, while zero cross signal ZXB is logic high, the value of COUNT is decremented (e.g., counter 212 counts down from the initial value). When zero cross signal ZXB transitions to logic low, the value of COUNT is incremented (e.g., counter 212 counts up until the count sector ends). At the end of the count sector, an ERROR value is generated based upon any difference between the final COUNT value and the initial COUNT value. For example, as shown in the illustrative timing diagram of FIG. 5, there is no ERROR value for count sector F, since the transition of zero cross signal ZXB occurred at the midpoint of count sector F. At the end of count sector F, the angular position, θ, and frequency, FREQ, of motor 104 are updated (e.g., from the values determined for count sector E). For example, the current frequency FREQ(n)=FREQ(n−1), and the current angular position θ(n)=θ(n−1)+FREQ(n), since ERROR=0. In count sector F, the FREQ signal has is reduced from count sector E (e.g., due to ERROR 510d), as shown by curve 512, and the angular position changes at a rate (e.g., slope 516f) as shown by curve 514, which is reduced due to ERROR 510d.

Figure 6:
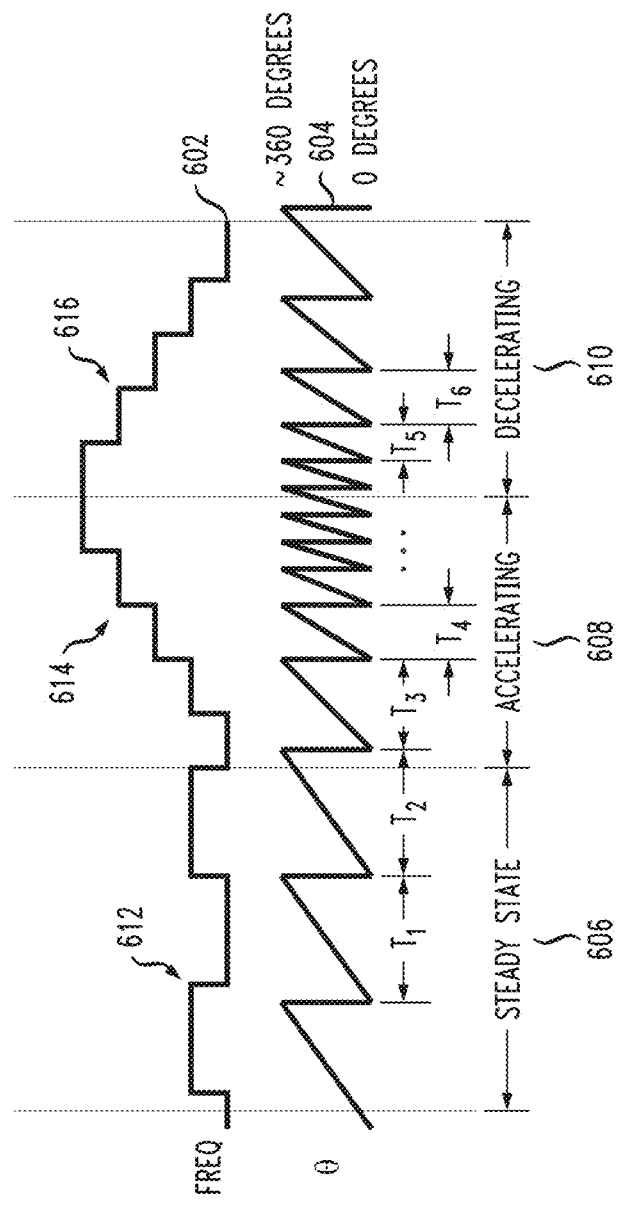
FIG. 6 is a timing diagram showing illustrative signals of the position and speed sensing circuit of FIG. 2 in accordance with illustrative embodiments.

FIG. 6 shows a timing diagram of an illustrative relationship between the angular position, θ (curve 604), frequency, FREQ (curve 602), and the speed of motor 104. For example, as shown in FIG. 6, when the speed of motor 104 is constant (shown as steady state period 606), the angular position, θ, increments from 0 to 359 degrees (and then restarting at 0 degrees) over a constant time period, $T_1$. The frequency signal, FREQ, may adjust occasionally (e.g., adjustments 612) to maintain the speed of motor 104 as a constant. When motor 104 is accelerating, for example during time period 608, the frequency signal, FREQ, may increase in one or more steps 614 as the speed of motor 104 increases. Similarly, as motor 104 increases in speed, the time period to complete a rotation decreases (e.g., as shown by time periods $T_2 > T_3 > T_4$, and so on) and, thus, the slope of the angular position, θ, increases. When motor 104 is decelerating, for example during time period 610, the frequency signal, FREQ, may decrease in one or more steps 616 as the speed of motor 104 decreases. Similarly, as motor 104 decreases in speed, the time period to complete a rotation increases (e.g., as shown by time periods $T_5 < T_6$, and so on) and, thus, the slope of the angular position, θ, decreases.

FIG. 7 shows a flow diagram of an illustrative process, 700, for operating motor driver 102. Process 700 starts at block 702, for example at an initial power on of motor system 100. At block 704, counter 212 is set to an initial value (e.g., 0). Also at block 704, frequency adjustment parameter, $K_f$, and position adjustment parameter, $K_P$, are set to initial values, for example based on one or more parameters of motor 104. At block 706, if a motor demand signal (e.g., frequency demand signal 131 of FIG. 1) is not received, then motor 104 may be idle (e.g., stopped), and process 700 remains at block 706 until a motor demand signal is received to start motion of motor 104.

At block 706, if a motor demand signal (e.g., frequency demand signal 131 of FIG. 1) is received, then at block 708, motor driver 102 generates motor phase control signals OUTA, OUTB and OUTC. At block 710, signal conditioning block 118 generates center tap signal 143. At block 712, zero cross detector 116 compares motor phase control signals OUTA, OUTB, and OUTC to center tap signal 143 to generate zero cross signals ZXA, ZXB, and ZXC. At block 714, position and speed sensing circuit 112 generates signals to adjust motor phase control signals OUTA, OUTB and OUTC based upon zero cross signals ZXA, ZXB, and ZXC. Process 700 returns to block 706 to receive a motor demand signal. Process 700 may run continually while motor system 100 is powered.

FIG. 8 shows additional detail of block 714 of FIG. 7, shown as process 714'. Process 714' may run continually while motor system 100 is powered, for example in parallel with process 700. At block 802, process 714' starts. At block 804, a count sector starts. At block 806, observer circuit 206 monitors zero cross signals ZXA, ZXB, and ZXC for a transition (edge). If, at block 806, observer circuit 206 is monitoring for a rising edge of a zero cross signal, at block 808 if the zero crossing signal is logic low, then at block 810 counter 212 is decremented. If, at block 806, observer circuit 206 is monitoring for a rising edge of a zero cross signal, at block 808 if the zero crossing signal is logic high, then at block 812 counter 212 is incremented. If, at block 806, observer circuit 206 is monitoring for a falling edge of a zero cross signal, at block 814 if the zero crossing signal is logic low, then at block 818 counter 212 is incremented. If, at block 806, observer circuit 206 is monitoring for a falling edge of a zero cross signal, at block 814 if the zero crossing signal is logic high, then at block 816 counter 212 is decremented. After any of blocks 810, 812, 816 or 818, process 714' proceeds to block 820.

At block 820, the angular position, θ, and frequency, FREQ, of motor 104 may be determined, for example based upon the previous angular position and frequency, such as described in regard to FIGS. 4A-4D and 5. At block 822, if the count sector has ended, then at block 824, the ERROR value may be determined based upon the COUNT value at the end of the count sector. At blocks 826 and 828, the angular position, θ, and frequency, FREQ, of motor 104 may be updated based upon the ERROR value (and any adjustment parameters). For example, the current frequency FREQ(n)=FREQ(n−1)+($K_f$·ERROR), and the current angular position θ(n)=θ(n−1)+($K_P$·ERROR)+FREQ(n), where the value of ERROR is based upon the value of the counter. At block 830, controller 126 may optionally adjust the speed signal (e.g., frequency demand signal 133) to, in turn, adjust the motor phase control signals OUTA, OUTB and OUTC in response to the determined angular position, θ, and frequency, FREQ, of motor 104.

At block 832, counter 212 is reset to the initial value (e.g., the count sector has ended), and process 714' returns to block 804 to start a subsequent count sector.

Thus, described embodiments provide hardware and/or software to control BLDC motors without the need for a complicated control processes, sense resistors in the motor current path, blanking time, or other similar complexities, while also being adjustable to operate a wide range of different motors.

As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

Illustrative embodiments may be implemented as a circuit, an integrated circuit, a multi-chip module, a single card, or a multi-card circuit pack. Various functions of circuit elements may also be implemented as processing blocks in a software program. Such software may be employed in, for example, a digital signal processor, microcontroller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. An electronic circuit for controlling operation of a brushless direct current (DC) motor having a plurality of windings, the electronic circuit comprising:
    a gate driver for providing an associated control signal to each of one or more switching elements coupled to the electronic circuit, the one or more switching elements controlling a voltage applied to each of the plurality of windings of the motor;
    a controller to generate a speed signal based upon a received frequency demand signal and provide the speed signal to the gate driver;
    a zero crossing detector for detecting a zero crossing of a voltage applied to at least one of the windings, the zero crossing detector configured to transition a zero crossing signal between a first logic level and a second logic level based on the detected zero crossing;
    a position estimator for estimating an angular position of the motor, the position estimator comprising a counter configured to count in a first predetermined direction based on the first logic level of the zero crossing signal, and configured to count in a second predetermined direction based on the second logic level of the zero crossing signal; and
    an observer for determining a value of the counter after a predetermined elapsed time, the observer configured to generate an angular position signal based, at least in part, upon the determined value of the counter, wherein the observer is configured to generate a frequency signal based, at least in part, upon the determined value of the counter and provide the frequency signal to the controller, wherein the controller is configured to generate the speed signal based upon the received frequency demand signal and the frequency signal, wherein the observer is configured to receive at least one adjustment parameter, the observer configured to generate at least one of the angular position signal and the frequency signal based upon the determined value of the counter and the at least one adjustment parameter, and wherein the at least one adjustment parameter comprises a frequency adjustment parameter, $K_f$, and wherein the observer is configured to generate the frequency signal by multiplying the determined value of the counter by the frequency adjustment parameter, added to a previous value of the frequency signal.

2. The electronic circuit of claim 1, wherein the one or more switching elements are coupled in a half-bridge circuit comprising at least one branch, each branch associated with a given one of the plurality of windings, each branch comprising a first switching element coupled between a high supply voltage and a switching node of the given winding, and a second switching element coupled between the switching node and a low supply voltage.

3. The electronic circuit of claim 1, wherein the gate driver receives the angular position signal from the observer, the gate driver configured to generate the control signal for each switching element based, at least in part, upon the angular position signal and the speed signal.

4. The electronic circuit of claim 1, wherein the at least one adjustment parameter comprises a position adjustment parameter, $K_P$, and wherein the observer is configured to generate the angular position signal by multiplying the determined value of the counter by the position adjustment parameter, added to a previous value of the angular position signal and added to the frequency signal.

5. The electronic circuit of claim 4, wherein the angular position signal is determined by: $\theta(n)=\theta(n-1)+(K_P \cdot ERROR)+FREQ(n)$, and wherein the frequency signal is determined by: $FREQ(n)=FREQ(n-1)+(K_f \cdot ERROR)$, wherein $\theta(n)$ is a current value of the angular position signal, $\theta(n-1)$ is the previous value of the angular position signal, $K_P$ is the position adjustment parameter, ERROR is the determined value of the counter, $FREQ(n)$ is a current value of the frequency signal, $FREQ(n-1)$ is the previous value of the frequency signal, and $K_f$ is the frequency adjustment parameter.

6. The electronic circuit of claim 4, wherein the frequency adjustment parameter adjusts a slope of the frequency signal, and wherein the position adjustment parameter adjusts a slope of the angular position signal.

7. The electronic circuit of claim 1, wherein the at least one adjustment parameter is determined based on one or more characteristics of the motor.

8. The electronic circuit of claim 7, wherein the one or more characteristics comprise a response time of the motor.

9. The electronic circuit of claim 1, wherein the counter comprises an up/down counter configured to increment the value of the counter based on the first logic level of the zero crossing signal, and decrement the value of the counter based on the second logic level of the zero crossing signal, wherein the first logic level is a logic high level, and the second logic level is a logic low level.

10. The electronic circuit of claim 9, wherein, if the determined value of the counter is non-zero, the observer is configured to adjust the frequency signal.

11. The electronic circuit of claim 10, wherein if the determined value of the counter is a positive value, the frequency signal is increased, and wherein if the determined value of the counter is a negative value, the frequency signal is decreased.

12. The electronic circuit of claim 9, wherein the controller is configured to employ the frequency signal as a reference signal to compare to the received frequency demand signal to run the motor at a substantially constant frequency.

13. The electronic circuit of claim 1, wherein the electronic circuit does not employ blanking time to determine the angular position of the motor.

14. The electronic circuit of claim 1, wherein the electronic circuit does not receive signals from one or more position sensors of the motor.

15. The electronic circuit of claim 1, wherein the zero crossing detector detects a zero crossing of a voltage applied to all of the windings.

16. The electronic circuit of claim 1, wherein the one or more switching elements each comprise a field effect transistor.

17. The electronic circuit of claim 1, wherein the electronic circuit is implemented in an integrated circuit.

18. The electronic circuit of claim 17, wherein the one or more switching elements are internal to the integrated circuit.

19. The electronic circuit of claim 17, wherein the one or more switching elements are external to the integrated circuit.

20. The electronic circuit of claim 1, further comprising:
a center tap averaging block coupled to the zero crossing detector and a voltage applied to at least one of the windings, wherein the center tap averaging block generates an approximate center tap voltage of the windings, and wherein the zero crossing detector detects a zero crossing based upon the approximate center tap voltage.

21. An electronic circuit for driving a load, the electronic circuit comprising:
a gate driver for providing an associated control signal to each of one or more switching elements coupled to the electronic circuit and the load, the one or more switching elements controlling a voltage applied to the load;
a controller to generate a speed signal based upon a received frequency demand signal and provide the speed signal to the gate driver;
a zero crossing detector for detecting a zero crossing of a voltage applied to the load, the zero crossing detector configured to transition a zero crossing signal between a first logic level and a second logic level based on the detected zero crossing;
a position estimator for estimating an angular position of the load, the position estimator comprising a counter configured to count in a first predetermined direction based on the first logic level of the zero crossing signal, and configured to count in a second predetermined direction based on the second logic level of the zero crossing signal; and
an observer for determining a value of the counter after a predetermined elapsed time, the observer configured to generate an angular position signal based, at least in part, upon the determined value of the counter, the observer configured to generate a frequency signal based, at least in part, upon the determined value of the counter and provide the frequency signal to the controller and wherein the controller is configured to generate the speed signal based upon the received frequency demand signal and the frequency signal, wherein the observer is configured to receive at least on adjustment parameter, the observer configured to generate at least one of the angular position signal and the frequency signal based upon the determined value of the counter and the at least one adjustment parameter, and wherein the at least one adjustment parameter comprises a frequency adjustment parameter, $K_f$, and a position adjustment parameter, $K_P$, and wherein the observer is configured to generate the frequency signal by multiplying the determined value of the counter by the frequency adjustment parameter, added to a previous value of the frequency signal, and wherein the observer is configured to generate the angular position signal by multiplying the determined value of the counter by the position adjustment parameter, added to a previous value of the angular position signal and added to the frequency signal.

22. The electronic circuit of claim 21, wherein:
the load comprises a brushless direct current (DC) motor having a plurality of windings;
the one or more switching elements are coupled in a half-bridge circuit comprising at least one branch, each branch associated with a given one of the plurality of windings, each branch comprising a first switching element coupled between a high supply voltage and a switching node of the given winding, and a second switching element coupled between the switching node and a low supply voltage; and the gate driver receives the angular position signal from the observer, the gate driver configured to generate the control signal for each switching element based, at least in part, upon the angular position signal and the speed signal.

23. The electronic circuit of claim 21, wherein the angular position signal is determined by: θ(n)=θ(n−1)+ ($K_P$·ERROR)+FREQ(n), and wherein the frequency signal is determined by: FREQ(n)=FREQ(n−1)+($K_I$·ERROR), wherein θ(n) is a current value of the angular position signal, θ(n−1) is the previous value of the angular position signal, $K_P$ is the position adjustment parameter, ERROR is the determined value of the counter, FREQ(n) is a current value of the frequency signal, FREQ(n−1) is the previous value of the frequency signal, and $K_I$ is the frequency adjustment parameter.

24. The electronic circuit of claim a 21, wherein the at least one adjustment parameter is determined based on one or more characteristics of the motor, and wherein the one or more characteristics comprise a response time of the motor.

25. The electronic circuit of claim 21, wherein the counter comprises an up/down counter configured to increment the value of the counter based on the first logic level of the zero crossing signal, and decrement the value of the counter based on the second logic level of the zero crossing signal, wherein the first logic level is a logic high level, and the second logic level is a logic low level.

26. The electronic circuit of claim 25, wherein:
if the determined value of the counter is a positive value, the frequency signal is increased; and
if the determined value of the counter is a negative value, the frequency signal is decreased.

27. The electronic circuit of claim 25, wherein the controller is configured to employ the frequency signal as a reference signal to compare to the received frequency demand signal to operate the load at a substantially constant frequency.

28. The electronic circuit of claim 21, further comprising:
a center tap averaging block coupled to the zero crossing detector and a voltage applied to at least one of the windings, wherein the center tap averaging block generates an approximate center tap voltage of the windings, and wherein the zero crossing detector detects a zero crossing based upon the approximate center tap voltage.

29. A method for controlling operation of a brushless direct current (DC) motor having a plurality of windings, the method comprising:
providing an associated control signal to each of one or more switching elements coupled to the electronic circuit, the one or more switching elements controlling a voltage applied to each of the plurality of windings of the motor;
generating a speed signal based upon a received frequency demand signal;
detecting a zero crossing of a voltage applied to at least one of the windings and transitioning a zero crossing signal between a first logic level and a second logic level based on the detected zero crossing;
counting, by a counter, in a first predetermined direction based on the first logic level of the zero crossing signal, and in a second predetermined direction based on the second logic level of the zero crossing signal;

determining a value of the counter after a predetermined elapsed time; and
generating an angular position signal based, at least in part, upon the determined value of the counter;
generating a frequency signal based, at least in part, upon the determined value of the counter and provide the frequency signal to the controller;
generating the speed signal based upon the received frequency demand signal and the frequency signal
receiving at least one adjustment parameter comprising a frequency adjustment parameter, $K_I$, and a position adjustment parameter, $K_P$;
generating at least one of the angular position signal and the frequency signal based upon the determined value of the counter and the at least one adjustment parameter;
generating the frequency signal by multiplying the determined value of the counter by the frequency adjustment parameter, added to a previous value of the frequency signal; and
generating the angular position signal by multiplying the determined value of the counter by the position adjustment parameter, added to a previous value of the angular position signal and added to the frequency signal.

30. The method of claim 29, wherein the one or more switching elements are coupled in a half-bridge circuit comprising at least one branch, each branch associated with a given one of the plurality of windings, each branch comprising a first switching element coupled between a high supply voltage and a switching node of the given winding, and a second switching element coupled between the switching node and a low supply voltage.

31. The method of claim 29, further comprising generating the control signal for each switching element based, at least in part, upon the angular position signal and the speed signal.

32. The method of claim 29, further comprising:
determining the angular position signal by: θ(n)=θ(n−1)+ ($K_P$·ERROR)+FREQ(n); and
determining the frequency signal by: FREQ(n)= FREQ(n −1)+($K_I$·ERROR),
wherein θ(n) is a current value of the angular position signal, θ(n−1) is the previous value of the angular position signal, $K_P$ is the position adjustment parameter, ERROR is the determined value of the counter, FREQ(n) is a current value of the frequency signal, FREQ(n−1) is the previous value of the frequency signal, and $K_I$ is the frequency adjustment parameter.

33. The method of claim 29, further comprising adjusting a slope of the frequency signal based upon the frequency adjustment parameter, and adjusting a slope of the angular position signal based upon the position adjustment parameter.

34. The method of claim 29, further comprising determining the at least one adjustment parameter based on one or more characteristics of the motor.

35. The method of claim 34, wherein the one or more characteristics comprise a response time of the motor.

36. The method of claim 29, further comprising:
incrementing the value of the counter based on the first logic level of the zero crossing signal, and decrementing the value of the counter based on the second logic level of the zero crossing signal, wherein the first logic level is a logic high level, and the second logic level is a logic low level.

37. The method of claim 29, further comprising:
if the determined value of the counter is a positive value, increasing the frequency signal; and
if the determined value of the counter is a negative value, decreasing the frequency signal.

38. The method of claim 29, further comprising comparing the frequency signal to the received frequency demand signal, and, based upon the comparison, operating the motor at a substantially constant frequency.

39. The method of claim 29, further comprising:
generating an approximate center tap voltage of the windings, and
detecting a zero crossing based upon the approximate center tap voltage.

40. An electronic circuit for controlling operation of a brushless direct current (DC) motor having a plurality of windings, the electronic circuit comprising:
a gate driver for providing an associated control signal to each of one or more switching elements coupled to the electronic circuit, the one or more switching elements controlling a voltage applied to each of the plurality of windings of the motor;
a controller to generate a speed signal based upon a received frequency demand signal and provide the speed signal to the gate driver;
a zero crossing detector for detecting a zero crossing of a voltage applied to at least one of the windings, the zero crossing detector configured to transition a zero crossing signal between a first logic level and a second logic level based on the detected zero crossing;
a position estimator for estimating an angular position of the motor, the position estimator comprising a counter configured to count in a first predetermined direction based on the first logic level of the zero crossing signal, and configured to count in a second predetermined direction based on the second logic level of the zero crossing signal; and
an observer for determining a value of the counter after a predetermined elapsed time, the observer configured to generate an angular position signal based, at least in part, upon the determined value of the counter, wherein the observer is configured to generate a frequency signal based, at least in part, upon the determined value of the counter and provide the frequency signal to the controller, wherein the controller is configured to generate the speed signal based upon the received frequency demand signal and the frequency signal, wherein the observer is configured to receive at least one adjustment parameter, the observer configured to generate at least one of the angular position signal and the frequency signal based upon the determined value of the counter and the at least one adjustment parameter, and wherein the at least one adjustment parameter comprises a frequency adjustment parameter, $K_f$, wherein the at least one adjustment parameter is determined based on one or more characteristics of the motor.

41. The electronic circuit of claim 40, wherein the one or more switching elements are coupled in a half-bridge circuit comprising at least one branch, each branch associated with a given one of the plurality of windings, each branch comprising a first switching element coupled between a high supply voltage and a switching node of the given winding, and a second switching element coupled between the switching node and a low supply voltage.

42. The electronic circuit of claim 40, wherein the gate driver receives the angular position signal from the observer, the gate driver configured to generate the control signal for each switching element based, at least in part, upon the angular position signal and the speed signal.

* * * * *